(12) United States Patent
Roth et al.

(10) Patent No.: US 7,343,052 B2
(45) Date of Patent: Mar. 11, 2008

(54) END-USER-NAVIGABLE SET OF ZOOMED-IN IMAGES DERIVED FROM A HIGH-RESOLUTION MASTER IMAGE

(75) Inventors: James M. Roth, Novato, CA (US); Kenneth G. Oetzel, Novato, CA (US)

(73) Assignee: Sonic Solutions, Novato, CA (US)

( * ) Notice: Subject to any disclaimer, the term of this patent is extended or adjusted under 35 U.S.C. 154(b) by 556 days.

(21) Appl. No.: 10/119,993

(22) Filed: Apr. 9, 2002

(65) Prior Publication Data

US 2003/0190158 A1 Oct. 9, 2003

(51) Int. Cl.
*G06K 9/32* (2006.01)

(52) U.S. Cl. ............... 382/299; 345/698; 345/3.3; 345/672; 348/333.11; 348/240.99

(58) Field of Classification Search ............ 382/299
See application file for complete search history.

(56) References Cited

U.S. PATENT DOCUMENTS

| | | | | |
|---|---|---|---|---|
| 4,882,622 A | * | 11/1989 | Uzuda et al. ............... | 358/538 |
| 5,297,219 A | * | 3/1994 | Weldy ....................... | 382/299 |
| 5,363,213 A | * | 11/1994 | Coward et al. ............ | 382/299 |
| 5,430,486 A | * | 7/1995 | Fraser et al. ............. | 348/426.1 |
| 5,488,687 A | * | 1/1996 | Rich ......................... | 345/563 |
| 5,668,569 A | * | 9/1997 | Greene et al. ............. | 345/103 |
| 5,905,506 A | * | 5/1999 | Hamburg ................... | 345/672 |
| 5,987,380 A | * | 11/1999 | Backman et al. ........... | 701/208 |
| 6,034,699 A | * | 3/2000 | Wong et al. ............... | 345/441 |
| 6,081,278 A | * | 6/2000 | Chen ......................... | 345/473 |
| 6,192,393 B1 | * | 2/2001 | Tarantino et al. .......... | 709/203 |
| 6,204,879 B1 | * | 3/2001 | Koseki et al. .............. | 348/230.1 |
| 6,272,235 B1 | | 8/2001 | Bacus et al. | |
| 6,281,874 B1 | * | 8/2001 | Sivan et al. ................ | 345/660 |
| 6,556,724 B1 | * | 4/2003 | Chang et al. .............. | 382/299 |
| 6,587,119 B1 | * | 7/2003 | Anderson et al. .......... | 345/672 |
| 6,600,840 B1 | * | 7/2003 | McCrossin et al. ........ | 382/302 |
| 6,629,104 B1 | * | 9/2003 | Parulski et al. ............ | 707/102 |
| 6,646,680 B1 | * | 11/2003 | Mead et al. ............... | 348/230.1 |

(Continued)

FOREIGN PATENT DOCUMENTS

EP 1 050 846 A2 8/2000

(Continued)

OTHER PUBLICATIONS

Joly, Christian, "Enhancing the Control Features of a DVD Player," *Electronic Product Design*, Jan. 2000, pp. 21-24.

*Primary Examiner*—Matthew C. Bella
*Assistant Examiner*—Sath V. Perungavoor
(74) *Attorney, Agent, or Firm*—Fitch, Even, Tabin & Flannery (57) ABSTRACT

The invention relates generally to improvements in systems used in the development ("authoring") of interactive visual media. More particularly, the invention relates to (a) the automatic or semi-automatic generation of a set of files representing "zoomed-in" sections of a master high-resolution image file, and (b) the automatic or semi-automatic generation of the logical data required to allow navigation of the generated files by an end-user of an interactive visual medium, including but not limited to such optical disc formats as DVD-Video, DVD-Audio, Video CD, and Super Video CD, as well as media hosted by a server and delivered over a network.

38 Claims, 7 Drawing Sheets

U.S. PATENT DOCUMENTS

| | | | |
|---|---|---|---|
| 6,647,125 B2* | 11/2003 | Matsumoto et al. | 382/100 |
| 6,668,101 B2* | 12/2003 | Kaneda | 382/301 |
| 6,684,087 B1* | 1/2004 | Yu et al. | 455/566 |
| 6,700,589 B1* | 3/2004 | Canelones et al. | 345/660 |
| 6,847,388 B2* | 1/2005 | Anderson | 715/854 |
| 6,952,697 B1 | 10/2005 | Rothschild | |
| 6,982,729 B1* | 1/2006 | Lange et al. | 345/660 |
| 7,030,845 B2* | 4/2006 | Maa | 345/88 |
| 7,062,107 B1* | 6/2006 | Crosby et al. | 382/299 |
| 7,116,833 B2* | 10/2006 | Brower et al. | 382/240 |
| 7,190,380 B2* | 3/2007 | Damera-Venkata et al. | 345/698 |
| 7,190,839 B1* | 3/2007 | Feather et al. | 382/240 |
| 7,202,888 B2* | 4/2007 | Tecu et al. | 348/208.11 |
| 2001/0014184 A1* | 8/2001 | Bubie et al. | 382/293 |
| 2001/0056418 A1* | 12/2001 | Youn | 707/3 |
| 2002/0025084 A1* | 2/2002 | Yang et al. | 382/299 |
| 2002/0064309 A1* | 5/2002 | Shinagawa et al. | 382/206 |
| 2003/0108252 A1* | 6/2003 | Carrig | 382/299 |
| 2004/0028293 A1* | 2/2004 | Allen et al. | 382/300 |

FOREIGN PATENT DOCUMENTS

| | | |
|---|---|---|
| JP | 11-266437 | 5/1998 |
| WO | WO 98/29819 | 7/1998 |
| WO | WO 00/01150 | 1/2000 |
| WO | WO 01/69585 | 9/2001 |

* cited by examiner

END-USER-NAVIGABLE SET OF ZOOMED-IN IMAGES DERIVED FROM A HIGH-RESOLUTION MASTER IMAGE

BACKGROUND OF THE INVENTION

1. Field of the Invention

This invention relates generally to the development of interactive visual media, and, more specifically, to the generation of a set of files representing "zoomed-in" sections of a master high-resolution image file and the generation of the logical data required to allow navigation of the generated files.

2. Background Information

Within the field of this invention, visual media are media that are capable of presenting motion or still images to a viewer on a display such as a television screen or a computer monitor. "Interactive" visual media are distinct from "linear" or "passive" visual media because they allow the timing, order, and conditions governing presentation to vary depending on input from the end-user (the viewer).

Since the advent of the Compact Disc in the early 1980s, a wide range of CD-based interactive media have been developed and marketed, including CD-i, Video CD, Super Video CD, and a variety of CD-ROM formats intended for playback in computer-hosted CD-ROM drives. More recently, interactive visual media have been based on the DVD format as well, including DVD-Video and DVD-Audio. Programs with the same interactive characteristics may also be played back from a computer hard drive, either locally or from a server over a data or telephone network, and viewed in either a dedicated application or a general-purpose viewer such as an Internet browser.

In a typical interactive playback setting, user input is communicated to the playback device via a remote control or a computer mouse and keyboard. The user responds to on-screen prompts or menus (lists of possible options) by pressing keys or clicking the mouse. The playback path through the material available to be played is altered according to the choices or "navigation" of the user.

When presenting interactive visual media, a playback device works with two basic categories of data to create the experience of the end-user. Presentation data is the data that is actually seen or heard: the video, audio, graphics and text. Logical data is information about the order and conditions under which presentation data is presented. Logical data defines the way the content is organized, and also the way in which user input will affect the navigational flow through the presentation data.

The creation of interactive visual media is referred to as "authoring," that is generally accomplished using one or more software applications running on a computer. Logical data is generated to structure the playback of the presentation data, to define the "user interface" (e.g. menus) used to navigate the program, to define the choices offered to users during playback, and to define the response of the playback device to user input. The logical data created in authoring takes the form of files that can be read and interpreted by a playback device designed to play back the media format being authored.

Presentation data, meanwhile, is put into a form, such as a specific file format, that is playable by the target playback device. One of the types of presentation data used in interactive visual media is still images. Still images are frequently used as the background for menus, and may also be arranged into sequences displayed in a manner analogous to slides in a slide projector. The DVD-Video specification, for example, supports two types of still image presentations: Slide Shows, using finite cell still or a finite presentation time in which the duration of each image is predetermined, and Still Shows, using infinite cell still or VOBU still in which user input controls the timing of the progression from one image to the next. More information is given in the *DVD Specification for Read-Only Disc, Part 3, Video Specification*, version 1.0, © 1996, DVD Forum, which is hereby incorporated by reference, and in particular in Section 3.3.6.4, *Still and Pause*.

The specific form into which a still image is converted during authoring varies depending on the requirements of the interactive visual format that is being authored. Since such formats work with digital presentation data, however, the image generally must be digitized (if it was not originally acquired or created in digital form), scaled to the resolution at which it will be used in the finished program, and converted to a file format supported by the authoring software.

In digital images, the resolution is expressed as the number of horizontal pixels (the smallest point on the screen that may be individually addressed by the display device) by the number of vertical pixels (e.g. "640×480"). The proportion of the horizontal to the vertical is referred to as the "aspect ratio" (e.g. 4:3, the aspect ratio of the typical television screen). Resolutions that are close to the nominal resolution of a standard television set are often thought of as being normal or standard. Images with significantly greater resolution are thought of as being "high resolution."

Digital images may be created in a digital image processing program, shot on conventional film and scanned (digitized), or shot with a digital camera. In any of these cases, the images commonly exist at a high resolution. Many interactive visual media, however, only support playback of images at normal resolution. When prepared for incorporation into such media, images are scaled during authoring. As a result of this scaling, much of the data from the high-resolution image is no longer present in the prepared image as the highest native resolution of the format is lower than the original resolution of the image.

Many viewers of interactive media would like to be able to "zoom in" on a still image for a magnified view of certain areas of the full image. For instance, zooming in on the upper left of a 640×480 image might involve taking a 160×120 subsection of the full image and expanding it so that it fills 640×480 pixels. In this type of scaling, however, a single pixel in the original image would be represented in the scaled display by a 4×4 block of pixels of the same color-value. The result of this approach to zooming is substantial degradation in the apparent image quality in the zoomed-in view, with artifacts ("blockiness") that are apparent even to the untrained eye. In other words, the on-screen size of the zoomed-in section is greater than it was in the full (un-zoomed) image, but the visual information (detail) available to the viewer remains the same.

SUMMARY OF THE INVENTION

The present invention presents a way to author, automatically or semi-automatically, a set of files used to allow the end-user of an interactive visual medium to zoom in on areas of a still image, and, if the image originated at high resolution, to preserve detail in those zoomed-in areas even when the image is played back in a medium that does not support the playback of high-resolution images. The method generates a set of files representing "zoomed-in" areas (Sectors) of a master high-resolution image file, and also generates the logical data required to allow navigation of the generated files by end-users. The interactive visual media where this can be applied includes but is not limited to such optical disc formats as DVD-Video, DVD-Audio, Video CD, and Super Video CD, as well as media hosted by a server and delivered over a network.

Using the method of the invention, Sectors are created by dividing the screen into a grid. In an exemplary embodiment, the grid is divided into an equal number of parts horizontally and vertically, thereby maintaining in the Sectors the aspect ratio of the full image from which they are derived. In this case, the number of Sectors, therefore, is an integer (e.g. 4, 9, etc.) the square root of which is also an integer.

The starting point for the method described is a high-resolution digital image (the "source" file), such as might be created by a digital still camera. The source file is copied to a new file. The appropriate resolution of the new file is calculated by, in the example of an equal number of horizontal and vertical parts, first finding the square root of the number of Sectors, then multiplying by the horizontal and vertical pixel-counts, respectively, of the intended display resolution. For example, with nine Sectors and an intended display resolution of 720×480, the appropriate resolution would be 2160 (720×3) by 1440 (480×3). If needed, the method scales and crops the file to this resolution using established digital image-editing techniques. This file then becomes the "high-resolution master".

The high-resolution master becomes the basis for generation by the method of all the presentation data files needed to implement zoom-in capabilities on the image. These files are created using established techniques in the field of digital image manipulation and digital video effects. They include a "full-view still" scaled to the intended display resolution, a set of video sequences depicting a zoom-in from the full view to one of the Sectors, and a set of video sequences depicting a "pan" from one Sector to an adjacent Sector.

Using established computer programming techniques, the method also generates all the logical data files needed to allow a viewer to readily navigate the presentation data within the context of an interactive visual medium. The specifics of this logical data will vary depending on the target playback medium. In general, however, the logical data will include commands allowing the viewer to initiate playback of the zoom sequences from the full-view image, and of pan sequences when the display is fully zoomed-in to an individual Sector. If used within the context of an authoring application for a given interactive medium, the method will also generate the logical data required to incorporate into that medium all the presentation and logical data generated by the method.

Additional aspects, features and advantages of the present invention are included in the following description of specific representative embodiments, which description should be taken in conjunction with the accompanying drawings.

DESCRIPTION OF REPRESENTATIVE EMBODIMENTS

As discussed in the Background section, if no high-resolution file of the image in question is available during authoring, there is little that can be done to improve detail when zooming in on a given section. However, if the image is available in high resolution, the method of this invention allows the detail present in the original to be preserved in a zoomed-in section, even when the visual medium within which the image is displayed does not support playback of high-resolution images. At the same time, the method generates the logical data files that allow the user to readily access zoomed-in sections of the image when that image is played back on an interactive media player, computer, or other media playback device. The creation of presentation and logical data using this method may be fully automatic, or the author of the media in which the image appears may be given direct control over some or all parameters involved in the process.

The general context of the invention is the presentation of image files in interactive visual media, including but not limited to such optical disc formats as DVD-Video, DVD-Audio, Video CD, and Super Video CD, as well as media hosted by a server and delivered over a network. The following description covers implementation of the invention in the context of a software application used for authoring DVD-Video discs. In such an implementation, the steps described may be automatic, or the end-user may be given direct control over some or all parameters involved in those steps. The first part of the description below assumes a fully automatic process, followed by the case where the user is given more control.

The described method starts with a high-resolution digital image (the "source" file), such as might be created by a still digital camera. For this example, it is assumed that the aspect ratio of the source file is 4:3 (four units horizontal to three units vertical), and the video system of the DVD-Video disc being authored is NTSC. It is also assumed that the full image will be divided into nine areas on which it is possible to zoom in, with each area showing one-ninth of the source image (one third horizontally and one third vertically). These assumptions are relaxed below in a more general discussion that follows that of the exemplary embodiment. The exemplary embodiment results in the following nine Sectors: (1) top left, (2) top center, (3) top right, (4) middle left, (5) middle center, (6) middle right, (7) bottom left, (8) bottom center, and (9) bottom right. This arrangement is particularly suited to the standard arrangement of the numbers on a remote control or other numeric keypad.

Figure 1:
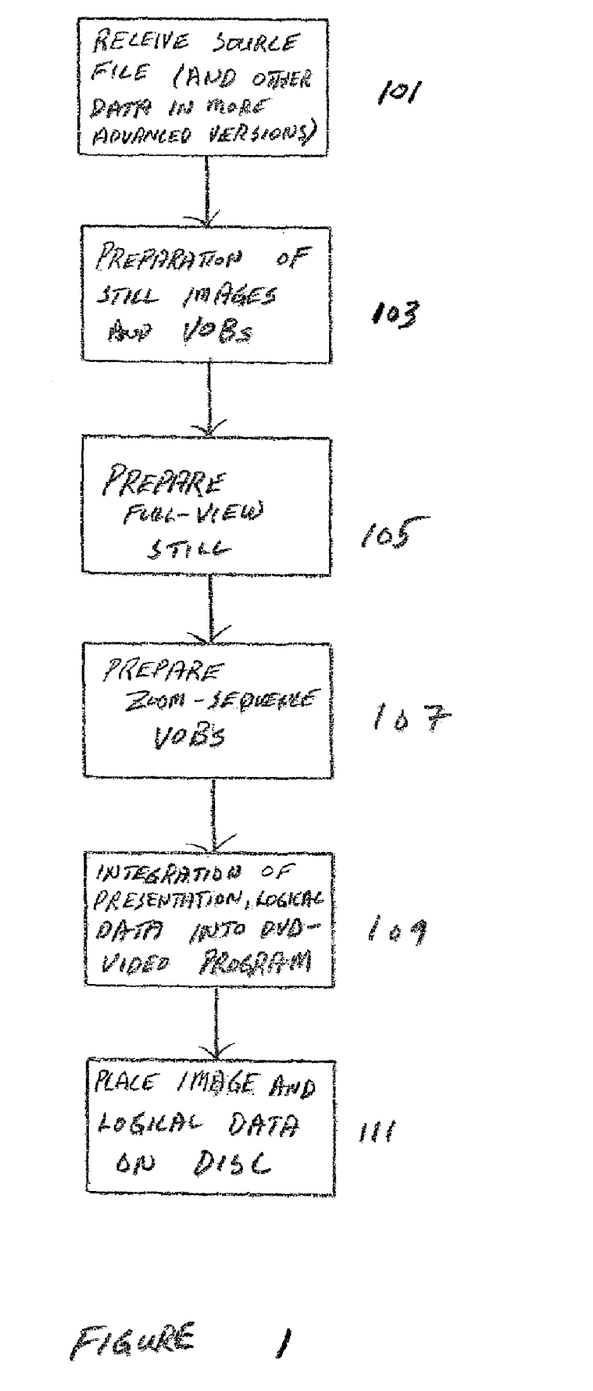
FIG. 1 is a flow chart of the steps undertaken by the DVD authoring application in an automated implementation.

The described method undertaken by the DVD authoring application in an automated implementation is shown in FIG. 1. The process starts in step 101 with the high-resolution digital image, or source file, being provided. When the process is not fully automatic, other user data may also be supplied. From this, the still images and a number of Video Objects (VOBs) connecting these are generated in step 103. The details of this include step 105 for preparation of the full still view, that is discussed more in FIG. 3, the preparation of the zoom and pan sequence VOBs in step 107, that is discussed more in FIG. 4, and the integration of the presentation and logical data into the DVD-Video program in step 109. Once all of the image and logical data is prepared, it can be placed on the medium in step 111.

Figure 2:
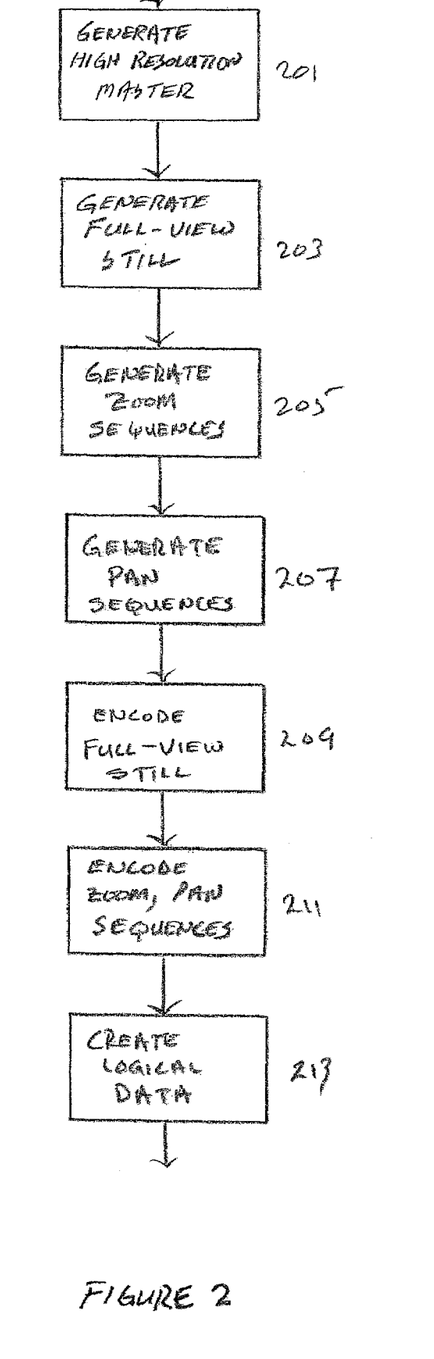
FIG. 2 presents more details on the preparation of still images and video objects.

FIG. 2 presents more details on the preparation of still images and video objects. Using the source file, in step 201 the process generates a new image, the "high-resolution master". In the NTSC standard example using 3×3 sectors, this is scaled to a resolution of 2160 pixels by 1440 pixels. In step 203, another new image, the "full-view still", is generated by scaling the high-resolution master to the standard resolution of 720 by 480.

Step 205 generates a set of video sequences, each of which zooms in from full view to one of the nine Sectors. The zoomed in Sector is the last frame of each sequence. The zoom sequence can be implemented in a number of ways, with different amounts of time allotted for the sequence, the extreme being an immediate jump to the final frame. In the intermediate stages of the sequence, different amounts of resolution may also be used, either improving the resolution as the zoom progresses or maintaining that of the full-view still until the final frame. In a less automated version, these can be user adjustable options. Similarly, step 207 generates a set of 24 video sequences, each of which pans from one Sector to a Sector that is either horizontally or vertically adjacent.

In step 209, the method encodes the full-view still into the appropriate video format, such as a DVD-Video compliant MPEG still in the exemplary embodiment. Step 211 encodes each of the nine zoom sequences and 24 pan sequences into DVD-Video compliant Video Objects (VOB files). In both these steps and the other steps in the described processes, these steps may be carried in a different order or simultaneously unless they rely on another step being completed before. Step 213 creates logical data defining each VOB as a single-cell Program Chain (PGC) that holds on the last frame (a full-screen frame of the destination Sector) rather than jumping to any other PGC in the DVD-Video title.

Figure 3:
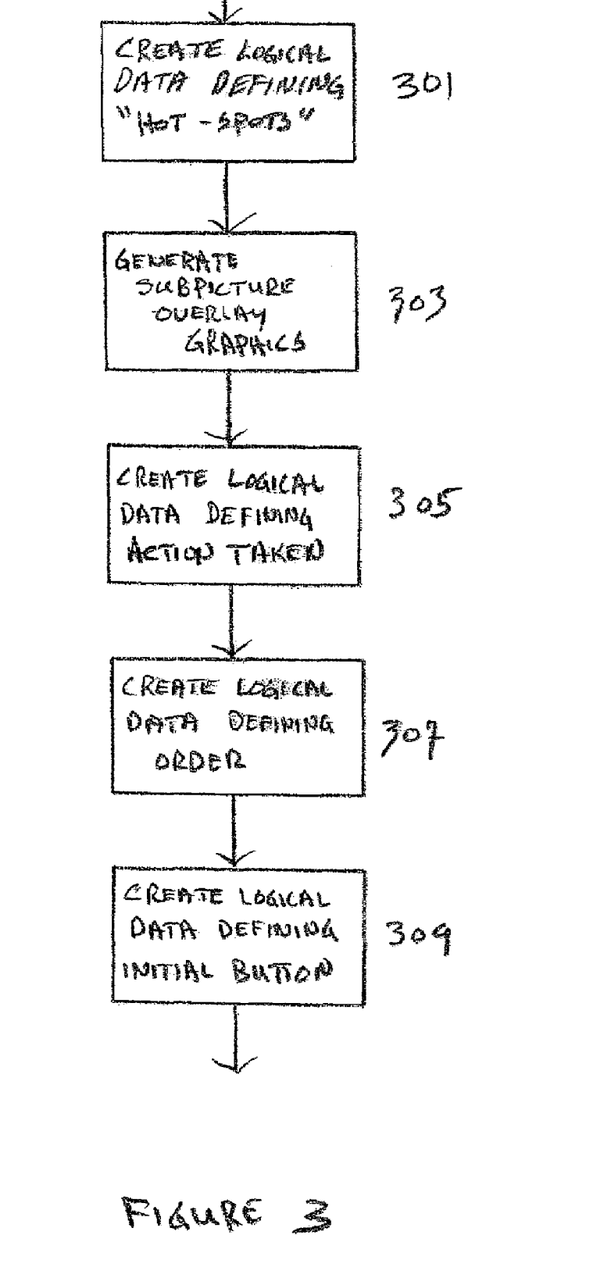
FIG. 3 presents more details on the preparation of the full-view still.

FIG. 3 describes the preparation of the full-view still in an exemplary embodiment. In step 301, the method creates logical data (button highlight information) defining a set of (in the 3×3 example) nine button "hot-spots" on the full-view still image. Each button covers a screen area equal to one Sector (one ninth of the screen). In 303, subpicture overlay graphics are generated to create an outline around the screen area of each of the nine buttons (effectively a grid defined by the nine Sectors). The overlay is set to be transparent when within the area of a button that is in the normal (unselected) state, and to be visible (not fully transparent) within the area of a button that is selected or activated.

Step 305 creates logical data defining the action taken when each of the nine buttons is selected and activated using the DVD-Video player remote control or mouse (if the DVD is played on a computer-hosted DVD drive). The action is to jump to the VOB that contains the zoom-in sequence from that button's Sector of the full-view still.

In step 307, the process creates logical data defining the order in which button selection is cycled in response to the Up, Left, Right, and Down keys on the remote control. If button 5 is selected, for instance, Up will select button 2, Left will select button 4, Right will select button 6, and Down will select button 8.

In step 309, logical data defining a tenth button on the full-view still may be created. The subpicture overlay for this button will be a small icon that indicates to the viewer that the current image is "zoomable." Using the DVD specification's "forced selection" parameter, button 10 is defined as the button that is in a selected state when the user initially navigates to the full-view still. Both the action defined for the activated state of button 10 and the button selection links from button 10 are set the same as for button 5.

Figure 4:
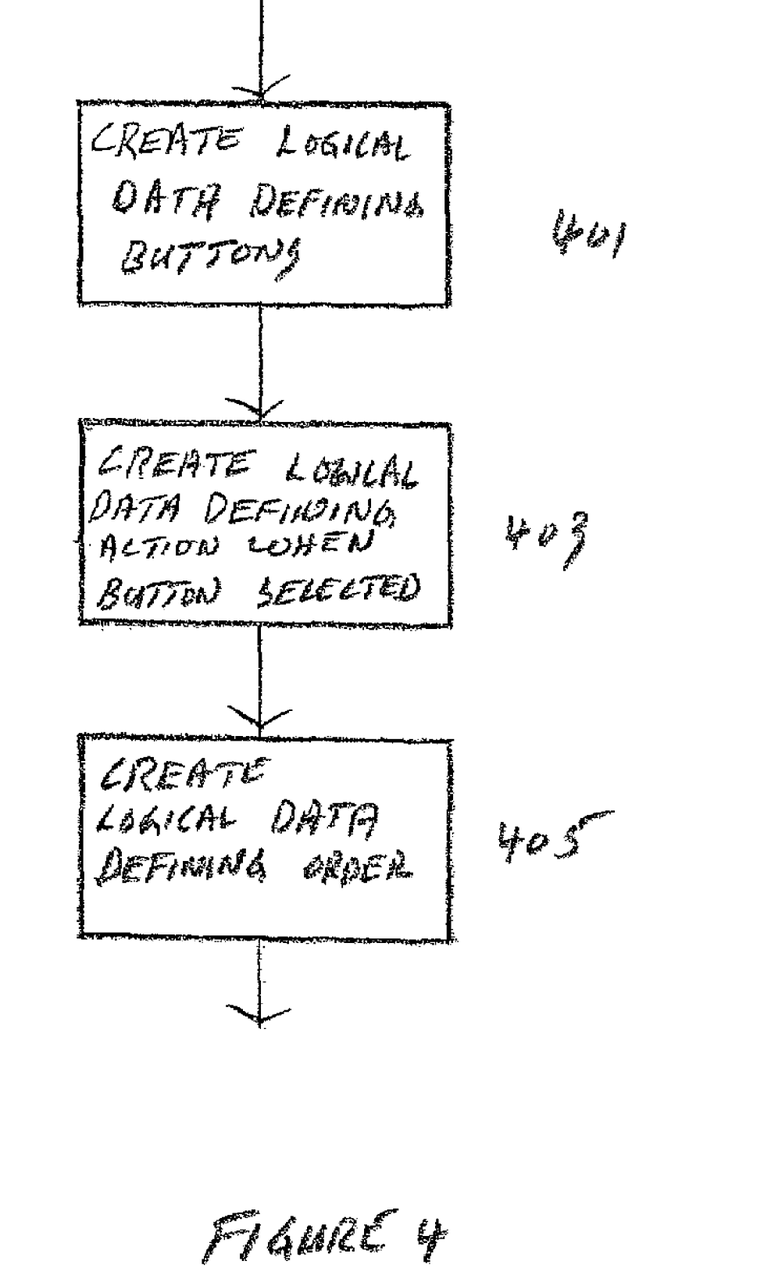
FIG. 4 presents more details on the preparation of the zoom-sequence video objects.

FIG. 4 provides more detail of the preparation of the zoom-sequence VOBs of step 107 of FIG. 1. This information can be presented in a number of ways, but one example will be described. For each of the nine zoom-sequence VOBs, the method creates logical data (button highlight information) defining a set of nine buttons that appear on the last frame of the VOB. This is shown in step 401. Of these nine buttons, buttons 1, 3, 5, 7, and 9 will be invisible (not associated with any subpicture overlay) in the exemplary embodiment. Except for button 5, their purpose is to maintain a numerical correspondence between the other buttons and the numeric keypad on the remote control. Of the remaining buttons (2, 4, 6, 8), the buttons that are visible in each VOB is determined by the directions in which it can be possible to pan horizontally or vertically from the Sector represented by that VOB.

From Sector 1, for instance, it is possible to pan down or to the right, but not up or to the left. Thus the method would assign a down-arrow icon at the right of the screen as the subpicture for button 6, and a right-arrow icon at the bottom of the screen as the subpicture for button 8, while buttons 2 and 4 would be invisible. In the VOB for Sector 5, meanwhile, the method would assign and appropriately position up-, left-, right-, and down-arrow icons for buttons 2, 4, 6, and 8 respectively. Button 5 can be defined by "forced selection" as the button that is in a selected state when the VOB initially reaches the last frame and each of the other nine buttons as "auto-activated" (activation upon selection).

Step 403 creates logical data defining the action taken when each of the nine buttons is selected. In a given VOB, if a button is visible, then the action defined for it is to jump to the VOB containing the pan in the direction indicated by it's icon. The action defined for button 5 is to jump back to the full-view slide. The action defined for the remaining non-visible buttons is to set the value of System Parameter 8 (Highlight Button Number) to "5", thereby keeping button 5 selected.

The exemplary embodiment of the automated process creates logical data defining the order in which button selection is cycled in response to the Up, Down, Left and Right keys on the remote control (or arrow keys on a computer keyboard) at step 405. From the initial selection of button 5, selection will move only to visible buttons whose arrow icons correspond with the direction of the key that is pressed. In the VOB for Sector 1, for instance, pressing the Right key will select (and thus auto-activate) button 6, and pressing the Down key will select (and thus auto-activate) button 8, while pressing the Left or Up keys will keep the selection on button 5. In the VOB for Sector 5, meanwhile, the Up, Left, Right, and Down keys will select (and thus auto-activate) buttons 2, 4, 6, and 8 respectively.

Returning back to FIG. 1, in step 109 integration of the presentation and logical data into the DVD-Video program occurs. This creates logical data defining the full-view still as a slide in a DVD-Video Slide Show. If the Slide Show also contains other slides comprised of one or more slides, those other slides may or may not be zoomable. Once all of the logical and image data is created, it can then be placed on the visual medium.

Figure 5:
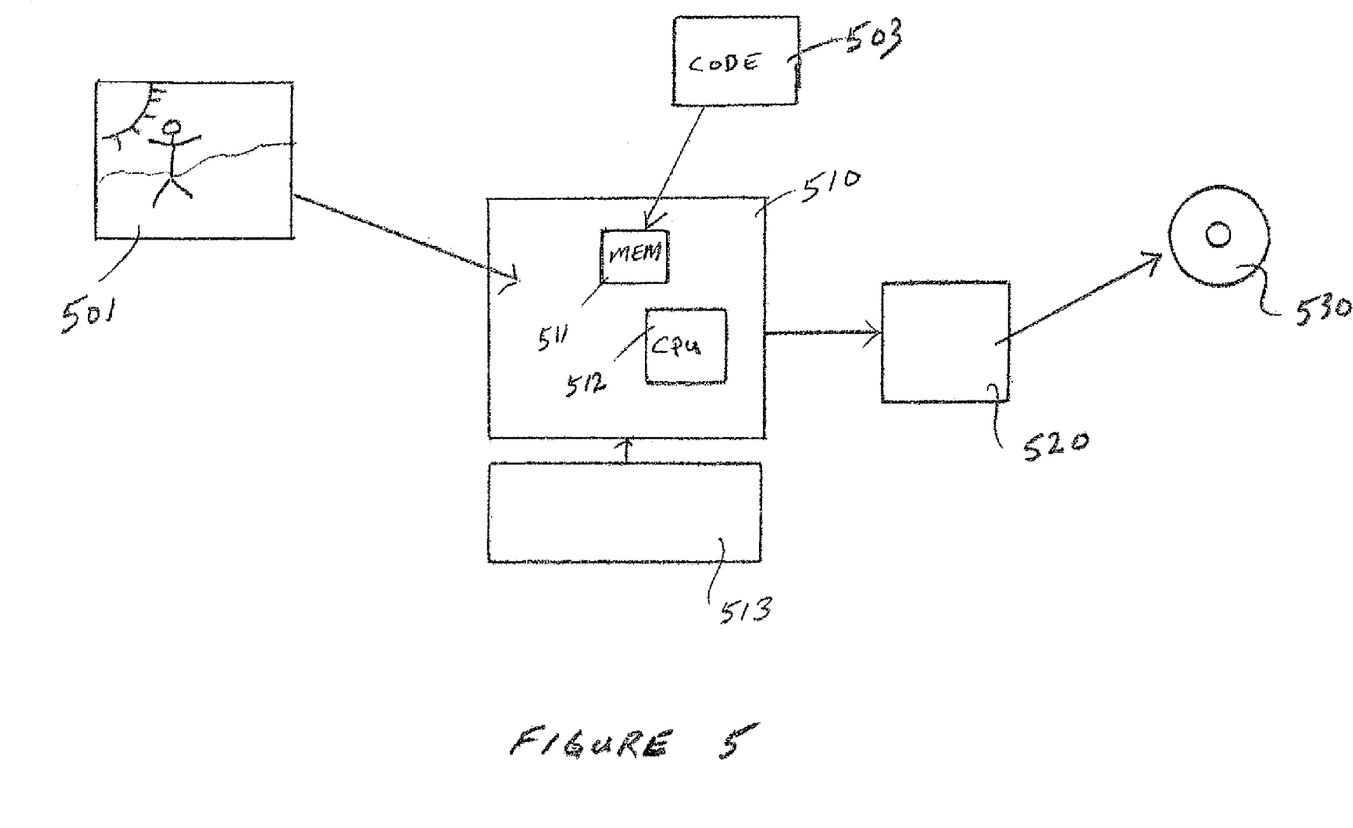
FIG. 5 is block diagram of the various components involved in an embodiment of the present invention.

FIG. 5 is block diagram of the various components involved in an embodiment of the present invention. The original image 501 or source file may originally be in digital form, such as might be created by a digital still camera, or else formed by digitizing, by scanning for instance, an analog image.

Block 510 is the simplified representation of a computer with a storage region 511 and a CPU 512, the other elements being suppressed in order to simplify the figure for this discussion. A program 503 from software or downloaded from another source allowing a user to perform the process is loaded into the computer. The user input (such as from a keyboard 513, mouse, or other control device) allows the user to control the use of the method contained in the code of 503 to perform the process in 512, whether in the automated form above or the more general case. The presentation and logical data is then supplied a recording unit 520 to place it on the media 530, such as a DVD disc.

It is well known in the art that logic or digital systems and/or methods can include a wide variety of different components and different functions in a modular fashion. The following will be apparent to those of skill in the art from the teachings provided herein. Different embodiments of the present invention can include different combinations of elements and/or functions. Different embodiments of the present invention can include actions or steps performed in a different order than described in any specific example herein. Different embodiments of the present invention can include groupings of parts or components into larger parts or components different than described in any specific example herein. For purposes of clarity, the invention is described in terms of systems that include many different innovative components and innovative combinations of innovative components and known components. No inference should be taken to limit the invention to combinations containing all of the innovative components listed in any illustrative embodiment in this specification. The functional aspects of the invention, as will be understood from the teachings herein, may be implemented or accomplished using any appropriate implementation environment or programming language, such as C++, COBOL, Pascal, Java, Java-script, etc.

It should be noted that the present method differs from just putting data that correspond to just the full, high-resolution digital image (the "source" file) on the disc. An interactive visual media and a player for the media that conforms to a standard, such as an optical disc in DVD-Video format, do not support the described zooming capability. If the full source file was stored on the medium, the player would need to unload the file and process this data to produce all the images in the zoom sequence, a capability a basic player lacks.

Based on the series of steps outlined in the described method above, a DVD-Video Slide Show containing one or more zoomable slides will behave as follows when the DVD-Video of which it is a part is played back by the end-user.

The user will navigate to the zoomable slide as part of a Slide Show. The only button visible will be button 10, which will indicate that the slide is zoomable. If the user takes no action, playback will automatically proceed to next slide in the Slide Show after the predetermined duration set for the slide during authoring.

Since button 10 is selected when the zoomable slide initially appears, if the user presses the Enter key on the remote control, playback will jump to the zoom-in sequence from Sector 5. If the user presses the Up, Left, Right, or Down keys, the selected button will change from 10 to 2, 4, 6, or 8 respectively. If the user presses a numeric key (1-9), the corresponding button will be selected. In any case, when button 1-9 is selected, the subpicture overlay within that button's area becomes visible (no longer transparent), outlining the corresponding Sector of the full-view image.

Pressing the Enter key will activate the selected button, jumping playback to the VOB containing the zoom-in sequence from that button's Sector of the full-view image. The zoom-in sequence will conclude with the frame showing the Sector zoomed to full screen. Depending on the Sector, two to four buttons will be visible, indicated by arrow icons corresponding to the direction of the available pan sequences from that Sector. If one of the visible buttons is selected with the arrow keys or the numeric keypad, that button will auto-activate, jumping playback to the pan sequence corresponding to the direction of the arrow icon. Alternatively, if the Enter key is pressed, button 5 will be activated, jumping playback back to the zoomable full-view slide.

Figure 6:
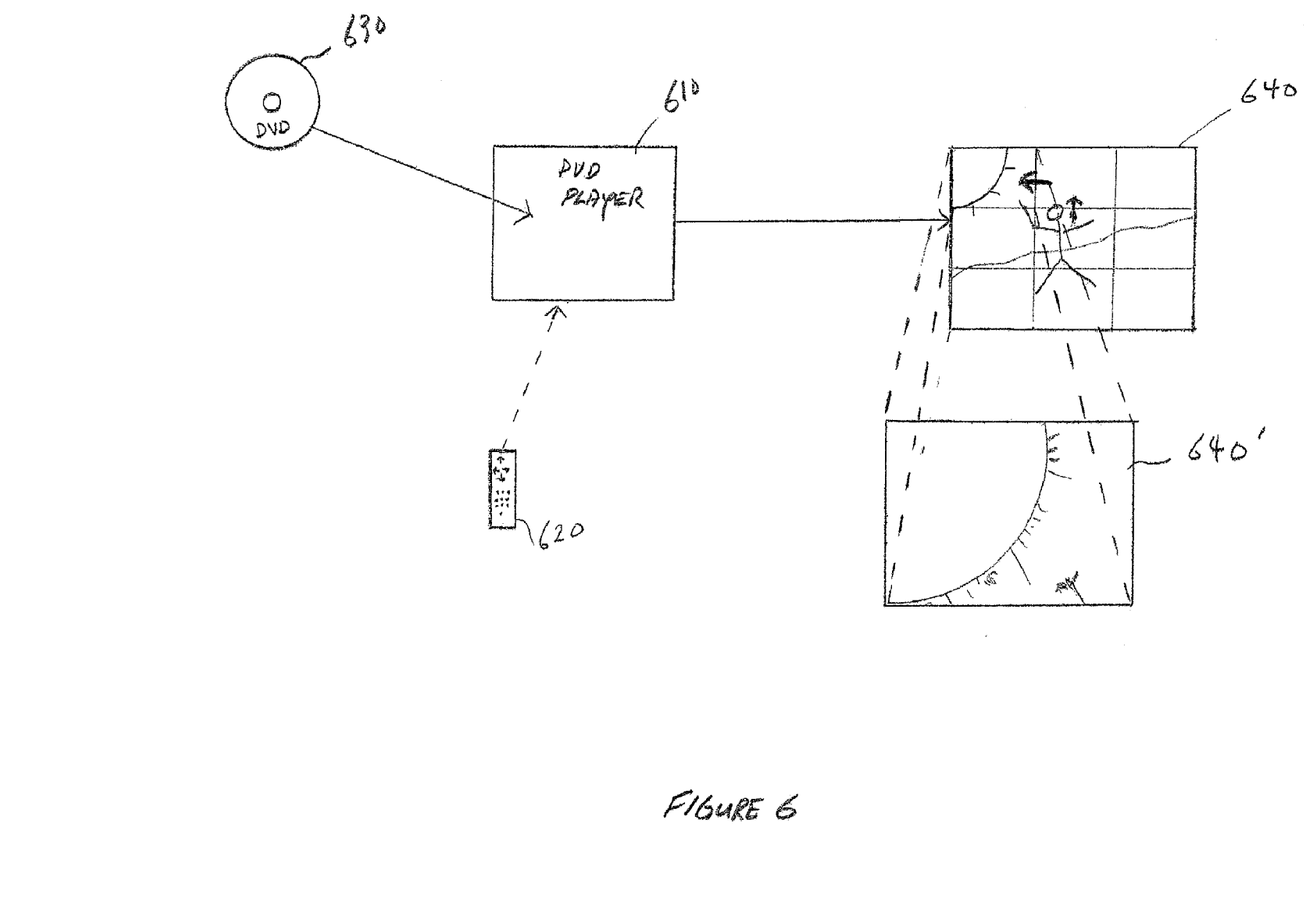
FIG. 6 is a block diagram of the operation of navigation process.

FIG. 6 is a block diagram of the operation of this process. An interactive visual medium, shown here as DVD 630, is loaded into the player 610. The user input is here through a controller 620 and the image is displayed on TV or monitor 640. The full view image in 640 is shown overlaid with the grid defining nine sectors. By using the controller as described, the user can zoom and navigate to a selected sector, shown here as the arrows from sector 5 to sector 2 to sector 1, to produced the zoomed end result shown as 640'.

The description above has referred to an exemplary embodiment, namely an automated process using 3×3 sectors for a slide show on a DVD-Video disc being authored in the NTSC standard. All of these specifics generalize. The still images and VOBs can be scaled to the PAL or other standards and the choice of interactive media affects the structure of the presentation and logical data in known, readily implementable ways. The presentation may also be presented in the form of a still show, either as the default or as a choice.

The end-user may also be given direct control over some or all parameters involved in the authoring process in a less automated, advanced implementation. The use of 3×3 sectors corresponds to a standard arrangement of buttons and arrows on a remote control, but in some cases other grids may be chosen in the authoring process. If a square grid with an N×N arrangement of sectors is chosen, the zoomed images can maintain the same aspect ratio as the full-view still. In particular, if N is odd the grid has a center sector. If a non-square grid is selected, the sectors will not have the same aspect ratio as the full-view still and the zoomed image will either not have the aspect ratio of the full-view still, part of the image will not be displayed if zoomed to fill the full display screen, or the image will be stretched in one direction.

Other parameters that could be controlled in less automated implementations are the rate of the zooms and pans and the resolution of the intermediate stages of the sequences. In the extreme case, the sequence could jump directly from the first image of the sequence to the final image. More generally, a time or rate value can be set for the zoom and pan sequences. Although the resolution of the final and initial frames in a sequence is set to particular values, an author could select different resolutions for the intermediate portions of the sequence. For instance, in a zoom sequence from the full-view still of a sector, the sequence may maintain the initial resolution until the last frame that would have the higher resolution, or it could progress through intermediate levels of resolution. In other embodiments, another set of controllable parameters would allow the user to specify the path through the image that the zoom or pan will follow.

The exemplary embodiment above has described an implementation for DVD-Video where the logical data for each of the zoom and pan sequence VOBs is a single cell PGC. For each slide in a slide show, there would be one full still view PGC plus nine zoom PGCs plus 24 pan PGCs for a total of 34 PGCs. Each of these PGCs would also be a Part of Title if the slide show were placed in a Title. The DVD specification states that no more than 999 PGCs and Parts of Title can be placed in a Title. If producing a slide show Title of more than 29 slides, it will be necessary to conserve the PGC and Part of Title resources. This may be accomplished by grouping the zoom and pan sequence VOBs in a single PGC. This way, only ten Parts of Title will be required per slide instead of the previous 34. This would allow a slide show title to have up to 99 slides.

Other logical structures for navigation are possible to work around the limits of the specifications of any of the target interactive visual media. It is also possible to simplify the implementation described above to further reduce the resource requirements.

Figure 7:
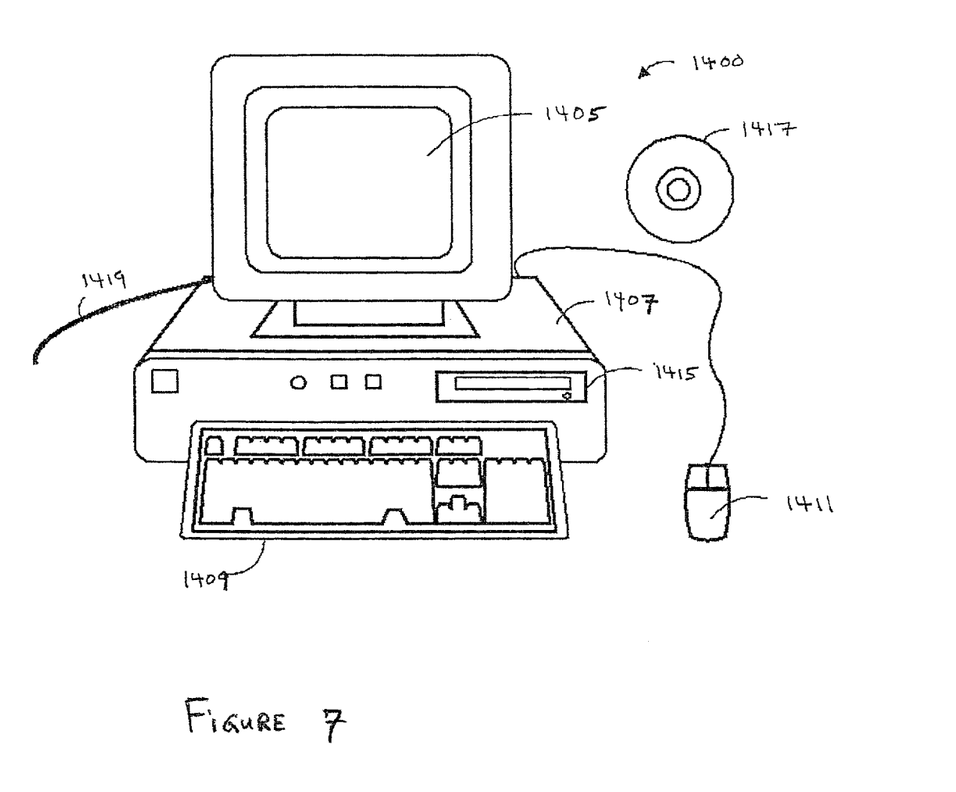
FIG. 7 shows the invention implemented in hardware and/or software.

As shown in FIG. 7, the invention can be implemented in hardware and/or software. In some embodiments of the invention, different aspects of the invention can be implemented in either client-side logic or a server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media program may be delivered to a user on a fixed media for loading in a users computer or a fixed media program can reside on a remote server that a user accesses through a communication medium in order to download a program component.

FIG. 7 shows an information appliance (or digital device) 1400 that may be understood as a logical apparatus that can read instructions from media 1417 and/or network port 1419. Apparatus 1400 can thereafter use those instructions to direct server or client logic, as understood in the art, to embody aspects of the invention. One type of logical apparatus that may embody the invention is a computer system as illustrated in 1400, containing CPU 1407, optional input devices 1409 and 1411, disk drives 1415 and optional monitor 1405. Fixed media 1417 may be used to program such a system and may represent a disk-type optical or magnetic media, magnetic tape, solid-state memory, etc. The invention may be embodied in whole or in part as software recorded on this storage media. Communication port 1419 may also be used to initially receive instructions that are used to program such a system and may represent any type of communication connection. The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

Although the various aspects of the present invention have been described with respect to specific exemplary embodiments, it will be understood that the invention is entitled to protection within the full scope of the appended claims.

It is claimed:

1. A method of creating an interactive visual medium comprising: providing an image at a first resolution;
   causing to be produced a first presentation data representing the image at a second resolution, wherein the second resolution is lower than the first resolution;
   defining a grid over substantially the entire first presentation data and dividing the first presentation data into a plurality of sectors defined by the grid with each sector having substantially the same size;
   causing to be produced a second presentation data of one of the plurality of sectors comprising a representation of a portion of the image at a third resolution higher than the second resolution and one or more pan sequences from a respective initial one of the plurality of respective portions of the image at the third resolution to an intermediate image of a portion of the image and to a respective final one of the plurality of respective portions of the image at the third resolution;
   causing to be produced logical data linking the first and second presentation data; and
   causing the logical data and the first and second presentation data to be placed on the interactive visual medium.

2. The method of claim 1, wherein said providing an image at a first resolution comprises rendering an analog image into digital form.

3. The method of claim 1, wherein the second presentation data further comprises a zoom sequence from the image at the second resolution to a portion of the image at the third resolution.

4. The method of claim 3, wherein the logical data allows a user to select the portion of the image where the zoom sequence comprises a zoom sequence from the image at the second resolution to a zoomed intermediate image and to the portion of the image at the third resolution.

5. The method of claim 1, wherein the second presentation data further comprises a plurality of zoom sequences from the image at the second resolution to a plurality of respective portions of the image at the third resolution.

6. The method of claim 1, wherein the logical data allows a user to select the initial one of the plurality of respective portions of the image at the third resolution to the final one of the plurality of respective portions of the image at the third resolution.

7. The method of claim 1, wherein interactive visual medium comprises a portable storage medium that includes an optical disc format.

8. The method of claim 7, wherein the logical data and first and second presentation data are placed on the optical disc the portable storage medium in a format that does not support presentation of an image at multiple resolutions.

9. The method of claim 7, wherein said optical disc format comprises one of a DVD-Audio format, a Video CD format, and a Super Video CD format.

10. The method of claim 7, wherein said optical disc format is a DVD-Video format.

11. The method of claim 1, wherein said causing to be produced the first and second presentation data and the logical data and causing the logical data and the first and second presentation data to be placed on the interactive visual medium are performed in a automated process.

12. The method of claim 1, further comprises:
    generating the image at the first resolution from an original image by altering the original image according to a horizontal pixel count, a vertical pixel count and the number of sectors.

13. The method of claim 12, wherein generating the image at the first resolution comprises altering the original image based on a square root of the number sectors multiplied by the number of horizontal pixel count to define a horizontal pixel count of the image, and the square root of the number of sectors multiplied by the number of vertical pixel count to define a vertical pixel count of the image.

14. The method of claim 1, further comprising:
causing the image to be placed on the interactive visual medium as one image of a plurality of images stored on the interactive visual medium where the plurality of images are logically associated in a sequence to be played back sequentially.

15. A method of creating content for an interactive visual medium comprising:
receiving an image at a first resolution;
forming a first presentation data representing the image at a second resolution, wherein the second resolution is lower than the first resolution;
defining a grid over substantially the entire first presentation data and dividing the first presentation data into a plurality of sectors defined by the grid with the plurality of sectors having substantially the same size;
forming a second presentation data of one of the plurality of sectors comprising a representation of a portion of the image at a third resolution higher than the second resolution and one or more pan sequences from a respective initial one of the plurality of respective portions of the image at the third resolution to a respective final one of the plurality of respective portions of the image at the third resolution; and
forming logical data linking the first and second presentation data, wherein the logical data and first and second presentation data are encoded in the format of the interactive visual medium.

16. The method of claim 15, wherein the second presentation data further comprises a zoom sequence from the image at the second resolution to a portion of the image at the third resolution.

17. The method of claim 16, wherein the logical data allows a user to select the portion of the image.

18. The method of claim 15, wherein the second presentation data further comprises a plurality of zoom sequences from the image at the second resolution to a plurality of respective portions of the image at the third resolution.

19. The method of claim 15, wherein the logical data allows a user to select the initial one of the plurality of respective portions of the image at the third resolution to the final one of the plurality of respective portions of the image at the third resolution.

20. The method of claim 15, wherein interactive visual medium is in an optical disc format.

21. The method of claim 20, wherein said optical disc format comprises at least one of a DVD-Audio format, a DVD-Video format, a Video CD format, and a Super Video CD format.

22. The method of claim 15, wherein said method of creating content for an interactive visual medium is performed in an automated process.

23. A computer readable storage medium having stored thereon an electronic data file readable by a digital apparatus, that when transferred into the digital apparatus causes the apparatus to operate in accordance with the method of claim 15.

24. The method of claim 15, wherein the forming the logical data comprises configuring the logical data defining the pan sequence as a distinct video object.

25. The method of claim 15, wherein the forming the logical data comprises configuring
the logical data defining each of a plurality of the pan sequences as a distinct video object and grouping the plurality of distinct video objects of the plurality of pan sequences in a single program chain.

26. A computer readable storage medium being an interactive visual medium having thereon content comprising:
a first presentation data representing an image at a first resolution;
a second presentation data of one of a plurality of sections of a grid defined over substantially the entire first presentation data where the plurality of sections are substantially the same size, wherein the second presentation data comprises a representation of a portion of the image at a second resolution higher than the first resolution and one or more pan sequences from a respective initial one of the plurality of respective portions of the image at the second resolution to an intermediate image of a portion of the image and to a respective final one of the plurality of respective portions of the image at the second resolution; and
logical data linking the first and second presentation data.

27. The interactive visual medium of claim 26, wherein the second presentation data further comprises a zoom sequence from the image at the first resolution to a portion of the image at the second resolution.

28. The interactive visual medium of claim 27, wherein the logical data allows a user to select the portion of the image.

29. The interactive visual medium of claim 26, wherein the second presentation data further comprises a plurality of zoom sequences from the image at the first resolution to a plurality of respective portions of the image at the second resolution.

30. The interactive visual medium of claim 26, wherein the logical data allows a user to select the initial one of the plurality of respective portions of the image at the second resolution to the final one of the plurality of respective portions of the image at the second resolution.

31. The interactive visual medium of claim 26, wherein interactive visual medium is in an optical disc format.

32. The interactive visual medium of claim 31, wherein the logical data and first and second presentation data are in a format that does not support presentation of an image at multiple resolutions.

33. The interactive visual medium of claim 31, wherein said optical disc format is a DVD-Audio format.

34. The interactive visual medium of claim 31, wherein said optical disc format is a DVD-Video format.

35. The interactive visual medium of claim 31, wherein said optical disc format is a Video CD format.

36. The interactive visual medium of claim 31, wherein said optical disc format is a Super Video CD format.

37. A computer readable storage medium being an interactive visual medium having thereon content in a format, comprising:
a sequence of a plurality of presentation data representing a plurality of images logically associated in the sequence, comprising first presentation data representing an image at a first resolution native to the format;

data representing a grid defined over substantially the entire first presentation data dividing the first presentation data into a plurality of sections where the sections have substantially the same size; and second presentation data representing one or more pan sequences from a respective initial one of a plurality of respective portions of the image at the resolution higher than the highest resolution native to the format to a respective final one of the plurality of respective portions of the image at the resolution higher than the highest resolution native to the format.

38. The interactive visual medium of claim 37, wherein the second presentation data further represents one or more zoom sequences of one or more of the plurality of sections of the image at a resolution higher than the highest resolution native to the format through which a user may navigate.

* * * * *